July 14, 1925.
P. O. PEDERSEN
1,545,599
METHOD OF AND MEANS FOR PRODUCING OSCILLATING CURRENTS OF HIGH FREQUENCY
Filed March 22, 1921
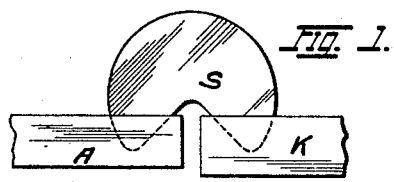
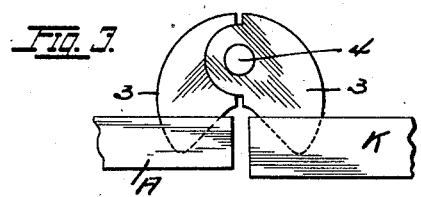
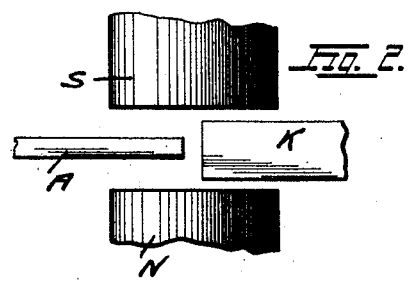
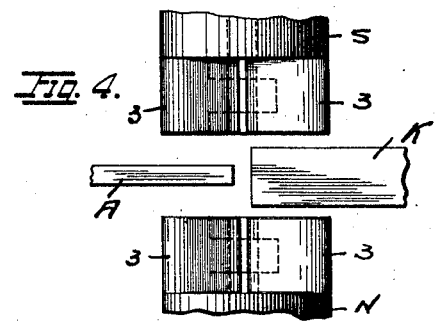
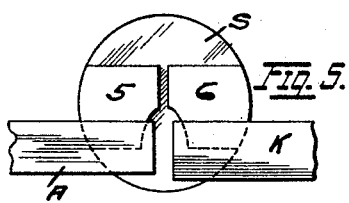
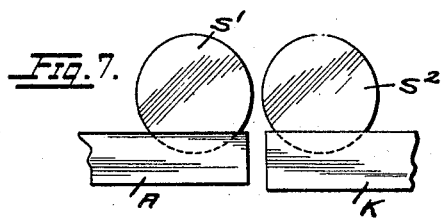
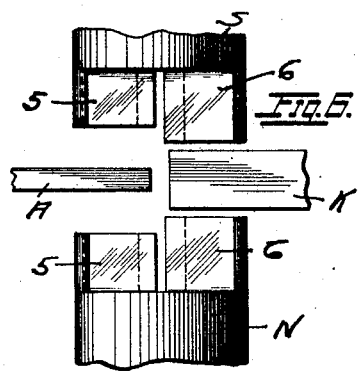
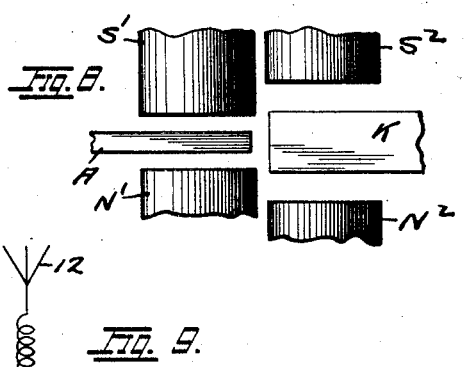
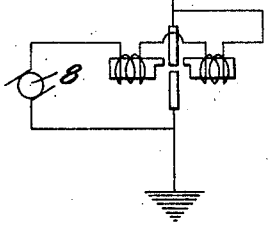
WITNESS
H. A. Sherburne
INVENTOR
P. O. PEDERSEN
BY
White Frost Simon
ATTORNEYS Patented July 14, 1925.

1,545,599

UNITED STATES PATENT OFFICE.

PEDER OLUF PEDERSEN, OF FREDERICKSBERG, DENMARK, ASSIGNOR TO POULSEN WIRELESS CORPORATION, A CORPORATION OF ARIZONA.

METHOD OF AND MEANS FOR PRODUCING OSCILLATING CURRENTS OF HIGH FREQUENCY.

Application filed March 22, 1921. Serial No. 454,547.

*To all whom it may concern:*

Be it known that I, PEDER OLUF PEDERSEN, a subject of the King of Denmark, and a resident of Fredericksberg, Denmark, have invented a certain new and useful Method of and Means for Producing Oscillating Currents of High Frequency, of which the following is a specification.

The invention relates to a method of and apparatus for producing high frequency current such as is employed in radio signaling.

Heretofore, arc generators for producing a high frequency current have comprised two electrodes between which the arc is formed, an atmosphere containing hydrogen or comparable gas, and means for producing a homogeneous transverse magnetic field. The arc body and its craters have been exposed to a magnetic field of substantially uniform density. When the intensity of this field under given conditions has a certain critical value, the percentage which the magnetic field adds to the efficiency of the arc generator has heretofore been considered as the maximum. It has now been determined, however, that the efficiency of the arc-generator can be further increased by using magnetic fields of different form.

The cycle of the arc comprises three stages, to wit, striking, burning and extinction. One of the functions of the magnetic field is to blow the arc out, or, in other words, to produce the necessary high extinction voltage at the end of each cycle, but the efficiency of the arc is increased when the arc voltage is kept low during the burning period. With the arc operating in a homogeneous transverse magnetic field, its bowing out or traveling out along the electrodes during a cycle will occur at a speed which is gradually increasing from the moment the arc is struck and, consequently, the arc resistance and the arc voltage are gradually increased during the cycle. I have determined that the efficiency of the arc will be increased if the arc voltage is maintained at a low value during the longer part of the cycle, and this low voltage is preferably that at which the arc started its traveling and then near the point of extinction is rapidly increased to the necessary extinction value.

An object of the invention, therefore, is to increase the efficiency of the arc generator.

Another object of the invention is to provide an improved method of producing radio frequency current.

Another object of the invention is to provide means for maintaining an arc at a very low voltage during the major part of a cycle and to rapidly increase the voltage at the end of the cycle to extinguish the arc.

The invention possesses other advantageous features, some of which, with the foregoing, will be set forth at length in the following description, where I shall outline in full, those forms of the apparatus of the invention which I have selected for illustration in the drawings accompanying and forming part of the present specification. In said drawings I have shown several forms of apparatus embodying my invention, but it is to be understood that I do not limit myself to such forms, since the invention, as expressed in the claims, may be embodied in other forms.

Referring to said drawings:

Fig. 1 is a diagrammatic representation of the two electrodes and one magnet pole piece shown in elevation.

Fig. 2 is a top view of the arrangement shown in Fig. 1.

Fig. 3 is an end elevation of a modified form of pole-piece in its environment.

Fig. 4 is a top view of the arrangement shown in Fig. 3.

Fig. 5 is an end elevation of a further modified form of pole-piece in its environment.

Fig. 6 is a top view of the arrangement shown in Fig. 5.

Fig. 7 is a side elevation of a further modified form of pole piece in its environment.

Fig. 8 is a top view of the arrangement shown in Fig. 7.

Fig. 9 is a diagrammatic representation of an oscillation generating circuit to which my invention is applicable.

In accordance with my invention, the arc is placed in an inhomogeneous transverse magnetic field, or fields, of such form, or forms, that at the instant of ignition the arc is disposed in a comparatively weak magnetic field and during the greater portion of its cycle or period is traveling through a comparatively weak magnetic field while toward the end of its cycle or period the arc is exposed to a strong magnetic field of such intensity that the extinguishing voltage is reached just at the right moment and within the shortest space of time. In other words, the arc is maintained in the weak magnetic field during the greater portion of its cycle and moves into the strong magnetic field as the instant of extinction approaches, causing the arc to operate efficiently and to be abruptly extinguished. I have also determined that under certain circumstances, a further advantage may be obtained by arranging the magnetic field so that the intensity of the field at the anode is different from that at the cathode.

In the drawings I have shown an anode A and a cathode K between which the arc is formed in the atmosphere containing hydrogen or its equivalent. The anode is usually formed of copper and is narrower than the cathode, which is usually formed of carbon. Arranged on opposite sides of the arc gap are pole pieces N and S between which a magnetic field is produced and the pole pieces are so formed that an inhomogeneous magnetic field is produced. In the construction shown in Fig. 1, the pole pieces are cut away at the bottom to provide somewhat lune-shaped pole faces with the cut-away portion of the faces lying in line with the arc gap and the full faces lying above the arc gap. The magnetic field in the arc gap is therefore much weaker than directly above the arc gap, so that the arc is struck in a weak field and as it burns and bows upwardly it moves into the strong field and is extinguished abruptly at the end of the cycle.

In Fig. 3 I have shown a modified form of construction in which sector shaped shoes 3 are pivotally mounted on the stud 4 on the end of the pole piece and the positions of the shoes may be varied while the arc is burning to vary the form of the field.

In Fig. 5 I have shown a construction which provides for the inhomogeneous magnetic field and at the same time provides for different flux intensities on the anode and cathode side of the arc. Each pole piece is formed with two projections 5—6, shaped to produce the inhomogeneous field, and the projections are of different length so that the projections 5 which are opposed to the anode lie farther apart than the projections 6, which are opposed to the cathode, thus producing a stronger magnetic field at the cathode side of the arc. Instead of providing each pole piece with two pole projections, two pole pieces on each side of the arc may be employed, as shown in Figs. 7 and 8. One pair of pole pieces N'—S' are arranged opposite the anode and the other pair N²—S² are arranged opposite the cathode. The difference in magnetic flux between the two sides of the arc may be obtained by different spacing of the pole pieces of each pair, as shown, or by varying the current in the magnet windings or by providing different numbers of turns in the magnet windings; in other words, providing different ampere turns on each pair of poles. The poles are positioned with their axes above the electrodes, so that the inhomogeneous magnetic field is produced, the field at the arc gap being weak and the field above the arc gap being strong.

The arc is supplied with current from the direct current generator 8 and the windings of the magnets are connected in series on the ungrounded side of the arc. Connected to the electrodes is an oscillatory circuit containing the inductance 9 and connected to the antenna 12. The other end of the circuit is grounded, the earth and the antenna forming capacity in the circuit.

I claim:

1. The method of increasing the efficiency of an arc converter that is connected to a load circuit to supply it with load current, which comprises alternatively igniting and extinguishing the arc at the frequency of the load current, influencing the arc by a transverse magnetic field, and causing said field to be substantially stronger at the time of extinction than at the time of ignition.

2. The method of increasing the efficiency of an arc converter that is connected to a load circuit to supply it with load current, which comprises alternatively igniting and extinguishing the arc at the frequency of the load current, and subjecting said arc during its periods of burning to a transverse magnetic field of such characteristics that as the arc bows out in these periods, it is subjected to a magnetic field the intensity of which increases from the time of ignition to that of extinction.

3. A radio frequency oscillation generator comprising a pair of electrodes between which an oscillating arc may be formed, and means for producing a transverse magnetic field near each electrode for affecting the arc, the field near one electrode being of greater intensity than that near the other.

4. A radio frequency constant wave oscillation generator comprising a pair of electrodes between which an oscillating arc may be formed, and means for producing an inhomogeneous transverse magnetic field for affecting the arc, the field being of substantially greater intensity near that region of the electrodes where the arc is broken.

5. In a radio frequency arc converter for producing constant wave oscillations, a pair of electrodes between which an arc may be formed, a load circuit supplied with current from the arc at the frequency of the ignition and extinction of the arc, and means for subjecting the arc to a transverse magnetic field, said field having intensities such that as the arc is bowed out to its extinction, the intensity of the field affecting it increases materially up to the point of extinction.

6. The method of operating a constant wave radio frequency arc converter, that is connected to a load circuit to supply it with load current which comprises causing the arc to be alternately ignited and extinguished at the frequency of the load current, while subjected to a transverse magnetic field, and subjecting the arc to an abruptly increased intensity of the field near the position of extinction.

7. In a radio frequency arc converter for producing constant wave oscillations, a pair of electrodes between which an arc may be formed, a load circuit supplied with current from the arc at the frequency of the ignition and extinction of the arc, and means for subjecting the arc to a transverse magnetic field, the field being such that as the arc bows to its extinction point, the intensity abruptly increases.

8. In a radio frequency arc converter for producing constant wave oscillations, a pair of electrodes between which the arc may be formed, a load circuit supplied with oscillating current from the arc, and means for extinguishing the arc periodically at the rate of the frequency of the load current, comprising means for producing a transverse magnetic field of non-uniform intensity, the intensity being weakest in the field where the arc is ignited, and strongest in the field where the arc is extinguished.

9. A constant wave arc generator for the generation of electrical oscillations of high frequency, comprising two electrodes between which an arc is formed, a load circuit supplied with current from the arc at the frequency of the ignition and extinction of the arc, and means for subjecting the arc to an inhomogeneous magnetic field so disposed with relation to the electrodes that the arc from the time of ignition to the time of extinction is subjected to a magnetic field of increasing intensity.

10. A constant wave arc generator for the generation of electrical oscillations of high frequency, comprising two electrodes between which an arc is formed, a load circuit supplied with current from the arc at the frequency of the ignition and extinction of the arc, and magnetic pole pieces arranged on opposite sides of the arc, the pole faces being shaped to produce an inhomogeneous magnetic field across the space through which the arc travels.

11. A constant wave arc generator for the generation of electrical oscillations of high frequency, comprising two electrodes between which an arc is formed, a load circuit supplied with current from the arc at the frequency of the ignition and extinction of the arc, and means for subjecting the arc to a transverse magnetic field of increasing intensity outward from the arc gap.

12. An arc generator for the generation of electrical oscillations of high frequency, comprising two electrodes between which an arc is formed, magnetic pole pieces arranged on opposite sides of the arc and adjustable shoes on said pole pieces.

In testimony whereof, I have hereunto set may hand.

PEDER OLUF PEDERSEN.